(12) United States Patent
Lee

(10) Patent No.: US 8,837,905 B2
(45) Date of Patent: Sep. 16, 2014

(54) METHOD AND APPARATUS FOR PROVIDING MOVEMENT GUIDE IN VIDEO RECORDING DEVICE

(75) Inventor: Hyung-joo Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 297 days.

(21) Appl. No.: 12/884,537

(22) Filed: Sep. 17, 2010

(65) Prior Publication Data

US 2011/0142414 A1   Jun. 16, 2011

(30) Foreign Application Priority Data

Dec. 11, 2009   (KR) .................. 10-2009-0123396

(51) Int. Cl.
*H04N 9/80*      (2006.01)
*H04N 5/225*    (2006.01)
*H04N 5/262*    (2006.01)
*H04N 7/18*      (2006.01)
*G02B 27/64*    (2006.01)
*G03B 7/083*    (2006.01)
*G03B 7/093*    (2006.01)
*H04N 5/232*    (2006.01)

(52) U.S. Cl.
CPC ....... *H04N 5/23248* (2013.01); *H04N 5/23251* (2013.01)
USPC ...... 386/242; 348/153; 348/207.99; 348/239; 359/554; 396/246

(58) Field of Classification Search
USPC ............... 386/242, E9.011; 348/153, 207.99, 348/208.15, 239, 208.99; 356/28; 713/1; 359/554; 396/53, 153, 246
See application file for complete search history.

(56) References Cited

U.S. PATENT DOCUMENTS

| | | | |
|---|---|---|---|
| 5,109,249 A * | 4/1992 | Kitajima | 396/53 |
| 6,476,861 B1 * | 11/2002 | Min | 348/208.15 |
| 7,893,959 B2 * | 2/2011 | Miyata | 348/153 |
| 8,125,622 B2 * | 2/2012 | Gammenthaler | 356/28 |
| 2004/0260916 A1 * | 12/2004 | Ueda et al. | 713/1 |

* cited by examiner

*Primary Examiner* — Thai Tran
*Assistant Examiner* — Syed Hasan
(74) *Attorney, Agent, or Firm* — Sughrue Mion, PLLC

(57) ABSTRACT

Provided are a movement guide providing method of a video recording device. The method includes: measuring a movement speed according to a movement of the video recording device; comparing the measured movement speed value of the video recording device with a reference value; generating a guide sub screen that represents a result value of the comparing; and displaying the generated sub screen on a display main screen of the video recording device.

22 Claims, 7 Drawing Sheets

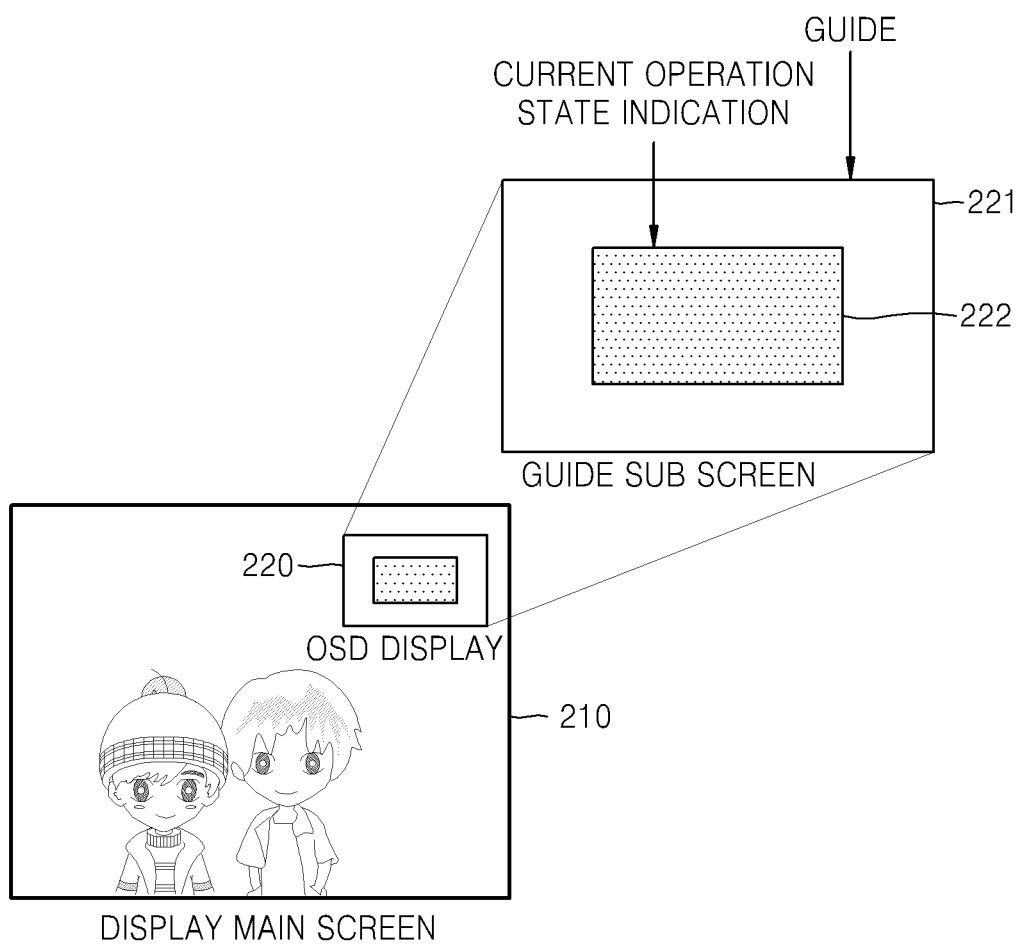

METHOD AND APPARATUS FOR PROVIDING MOVEMENT GUIDE IN VIDEO RECORDING DEVICE

CROSS-REFERENCE TO RELATED PATENT APPLICATION

This application claims priority from Korean Patent Application No. 10-2009-0123396, filed on Dec. 11, 2009 in the Korean Intellectual Property Office, the disclosure of which is incorporated herein in its entirety by reference.

BACKGROUND

1. Field

Apparatuses and methods consistent with the exemplary embodiments relate to an apparatus and a method for allowing a user to monitor a current video recording state by providing guide information of a current speed and a direction based on the movement of a video recording device.

2. Description of the Related Art

A video recording device such as a digital camcorder, a digital camera, etc. continuously records still images of more than 15 frames per second and displays the recoded still images on a display window such as a liquid crystal display (LCD).

However, during recording of a video, since unpredictable movement or shaking caused by a user's body may occur, stable recoding conditions may not be easily maintained without a fixing element such as a tripod. Accordingly, this instability of a physical recording condition may cause distortion of a recoded image.

This image distortion may be further worsened due to fine movements caused by a physical camera shutter. As the number of recorded frames per seconds is decreased (i.e., 15 frames per seconds from 30 frames per seconds), since an interpolation interval due to movements between frames or shaking is increased, image instability that a user feels becomes more serious.

Accordingly, various techniques for compensating for hand-shaking of a video recording device have recently been studied. For example, there are optical compensation techniques or non-optical or digital compensation techniques for hand-shaking compensation during recoding of a video.

The optical compensation techniques provide a device for overcoming shaking with respect to an image inputted through a complementary metal oxide silicon (CMOS) module so that video image stabilization can be obtained. For example, when a camera lens is shaken during recoding of a video, a gyro sensor is provided to physically move the center of the camera lens of a video recording device in a direction opposite to a camera lens movement.

In addition, the non-optical compensation techniques compensate images, which are recoded with a level of chip-based hardware or software. For example, the images are compensated by calculating a motion vector of a shaken video image and adjusting an image offset corresponding thereto.

In addition, when panning (i.e., recording a video by artificially following a subject), zooming (i.e., recording a video by changing the size of a subject), and oscillating (i.e., recording a video by shaking in a great range) occurs during recording of a video, a method for providing guide information to a user becomes useful, where the guide information includes feedback about shaking during a video recording state to monitor the movement of a current video recording device

SUMMARY

Exemplary embodiments relate to a method and an apparatus for providing a movement guide in a video recording device. That is, according to an exemplary embodiment, when a recorded video is reproduced for viewing, in order for a viewer to not feel uncomfortable while watching a video that is recorded by others, a movement guide is provided as feedback information to correct or maintain a user's shooting posture during recording of the video. Accordingly, recording of the video becomes more stable and viewing of the video becomes more comfortable.

According to an aspect of an exemplary embodiment, there is provided a movement guide providing method of a video recording device, the method including: measuring a movement speed according to a movement of the video recording device; comparing the measured movement speed of the video recording device with a reference value; generating a guide sub screen that represents a result of the comparing; and displaying the generated guide sub screen on a display main screen of the video recording device.

According to an aspect of another exemplary embodiment, there is provided a movement guide providing apparatus in a video recording device, the apparatus including: a movement speed measuring unit which measures a movement speed according to a movement of the video recording device; a speed comparing unit which compares the measured movement speed of the video recording device with a reference value; a guide generating unit which generates a guide sub screen that represents a result of the comparing by the speed comparing unit; and a screen display unit which displays the generated guide sub screen on a display main screen of the video recording device.

According to an aspect of another exemplary embodiment, there is provided a movement guide providing method of a video recording device, the method including: generating a guide sub screen that indicates whether a movement speed of the video recording device during a recording operation exceeds a reference value; and displaying the generated guide sub screen on the video recording device in real time during the recording operation.

BRIEF DESCRIPTION OF THE DRAWINGS

The above and other features and advantages will become more apparent by describing in detail exemplary embodiments with reference to the attached drawings in which:

FIG. 2 is a view illustrating an example of an on-screen display (OSD) in a display window according to an exemplary embodiment;

DETAILED DESCRIPTION OF EXEMPLARY EMBODIMENTS

Figure 1:
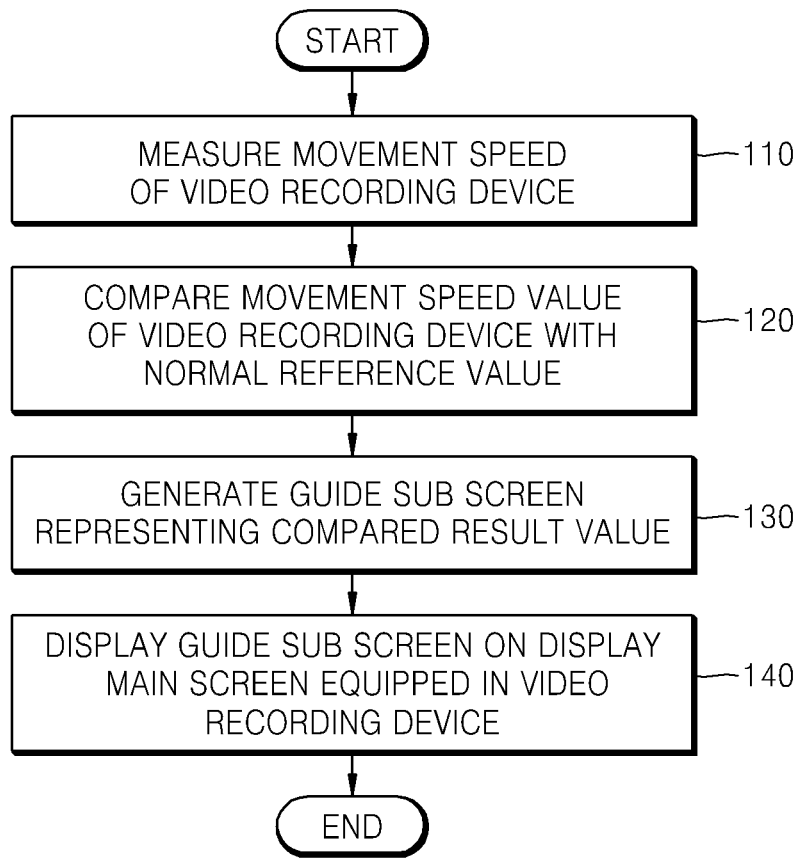
FIG. 1 is a flowchart illustrating a method of providing a movement guide in a video recording device according to an exemplary embodiment.

Hereinafter, exemplary embodiments will be described in more detail with reference to the accompanying drawings in which like reference numerals refer to like elements throughout. Expressions such as "at least one of," when preceding a list of elements, modify the entire list of elements and do not modify the individual elements of the list.

FIG. 1 is a flowchart illustrating a method of providing a movement guide in a video recording device according to an exemplary embodiment. Referring to FIG. 1, the method of providing the movement guide in the video recording device includes an operation 110 measuring a movement speed based on a movement of the video recording device, an operation 120 comparing the measured movement speed value of the video recording device with a normal reference value, an operation 130 generating a guide sub screen that represents the compared result value, and an operation 140 displaying the generated guide sub screen on a main screen of the video recording device.

In the operation 110, when the movement speed of the video recording device is measured, the movement may include an unintentional user behavior (e.g., a hand-shaking) and an intentional user behavior (e.g., at least one of panning that records a video by following a moving subject, zooming that drastically reduces or enlarges a size of the subject, and oscillating that a user can recognize).

At this point, by using a sensor equipped in the video recording device, the movement speed of the video recording device can be obtained by calculating the movement and a distance of the video recording device and a time that the video recording device takes for the movement.

Figure 5A:
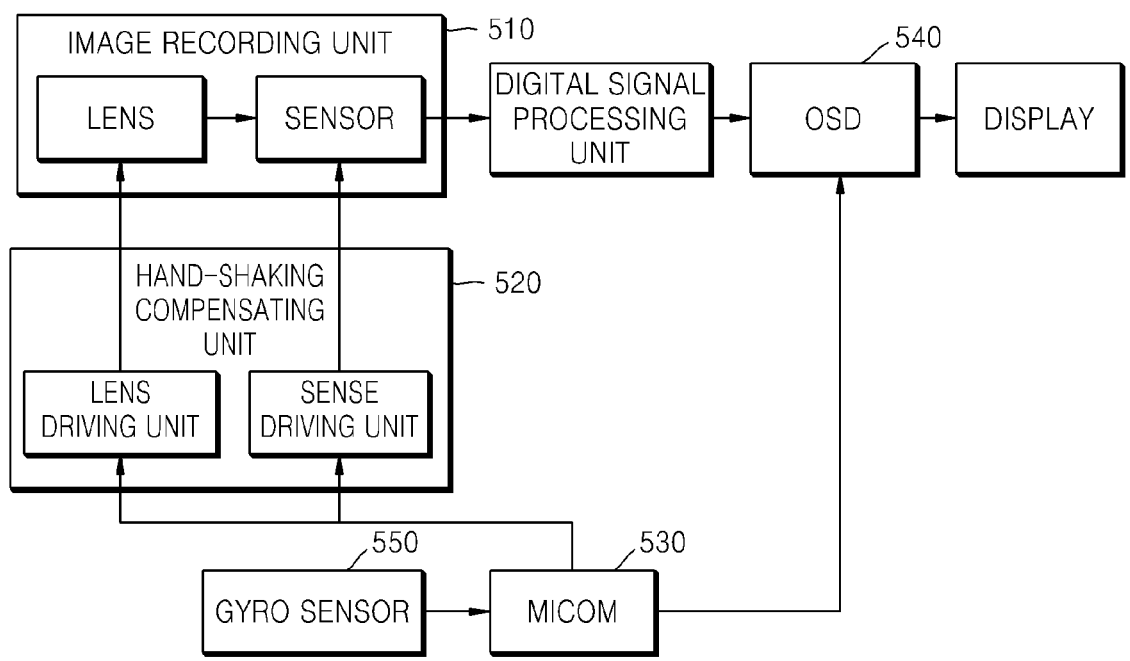
FIGS. 5A and 5B are functional block diagrams illustrating a configuration for measuring a movement speed of a video recording device through an optical image stabilization (OIS) method according to an exemplary embodiment and a digital image stabilization (DIS) method according to another exemplary embodiment.
Figure 5B:
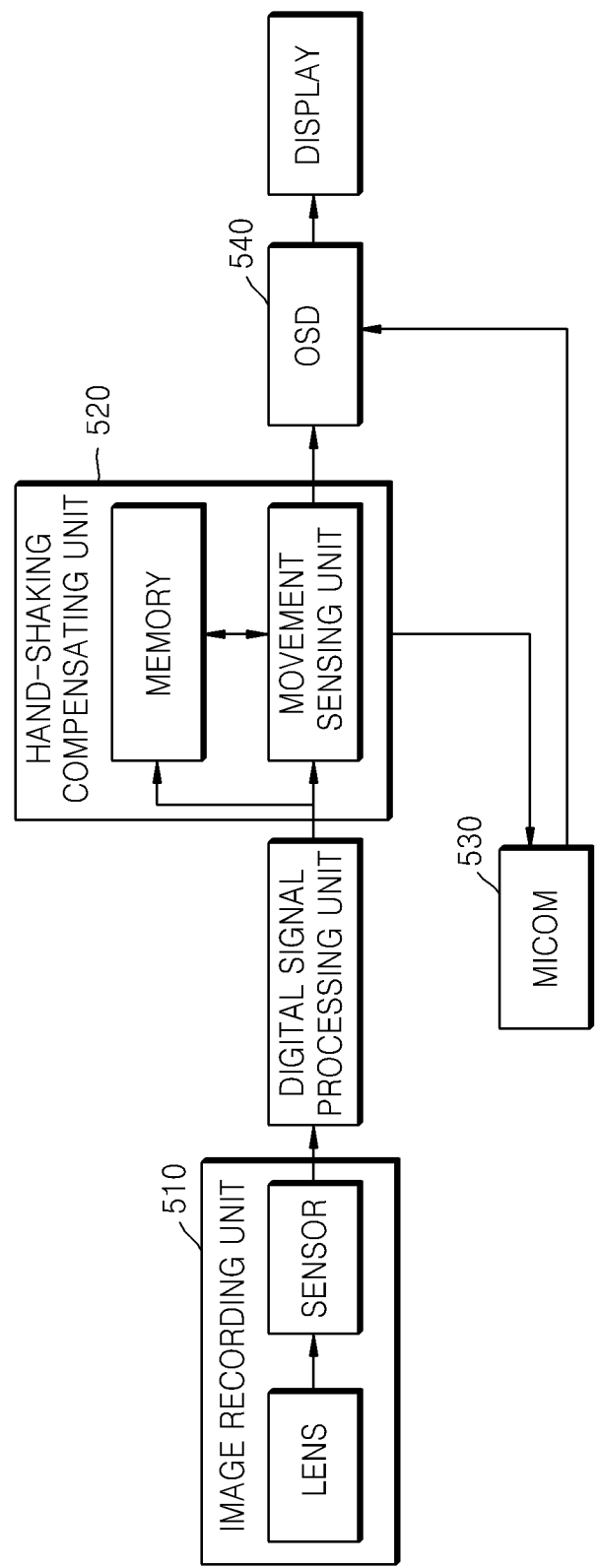

Furthermore, the measuring of the movement speed of the video recording device may be performed through an Optical Image Stabilization (OIS) method or a Digital Image Stabilization (DIS) method, which will now be described with reference to FIGS. 5A and 5B. FIG. 5A is a block diagram illustrating a configuration for measuring a speed of a video recording device using a gyro sensor through an OIS method according to an exemplary embodiment. FIG. 5B is a block diagram illustrating a configuration for measuring a movement of a video recording device using a motion vector through a DIS method according to another exemplary embodiment.

In FIGS. 5A and 5B, an image recording unit 510, a hand-shaking compensating unit 520, a micom 530, and an on-screen display (OSD) module 540 are shown. In FIG. 5A, the image recording unit 510 records external images and the hand-shaking compensating unit 520 drives a lens and a sensor to compensate for a physical movement. At this point, a movement guide providing device according to an exemplary embodiment may measure the movement speed of the video recording device using a gyro sensor 550. The micom 530 compares the movement speed value of the video recording device with the normal reference value (i.e., a predetermined experimental value) to generate the guide sub screen and displays the guide sub screen on a screen through the OSD module 540.

In FIG. 5B, the hand shaking compensation unit 520 with a movement sensing unit measures an external image that is recorded by the image recording unit 510. Then, the micom 530 compares the movement speed value of the video recording device with the normal reference value (i.e., a predetermined experimental value) to generate the guide sub screen and displays the guide sub screen on a screen through the OSD module 540.

Accordingly, the method and apparatus of providing a movement guide may be applied to the OIS method and the DIS method. Furthermore, the measuring of the movement of the video recording device may include a speed and a direction. The direction may refer to a one-dimensional direction in a three dimensional space including x, y, and z axes.

Referring back to FIG. 1, in operation 120, the measured movement speed value of the video recording device is compared with a normal reference value. Here, the normal reference value is an experimental value about a screen movement speed with which a user can feel comfortable while playing and watching recoded images. Accordingly, it is assumed that a video recoded with a movement speed exceeding the normal reference value makes a user feel dizzy or uncomfortable while playing and watching the recoded video. The normal reference value may be a variously combined value related to a direction. That is, according to a cognitive environment that people feel, a vertical direction may have an allowable value of 10 but a horizontal direction may have an allowable value of 5 (i.e., more rigid than the vertical direction) as a reference value.

Moreover, based on a direction that a video recording device moves, the method may further include calculating a differential value of the measured movement speed value and the normal reference value. That is, if the video recording device suddenly moves to the left, a differential value of the normal reference value with respect to a left direction is calculated and then a comparison result value is calculated.

In the operation 130, a guide sub screen representing the compared result value is generated. The guide sub screen is a sub screen representing the normal reference value and the movement speed value of the video recording device using, for example, a graph figure. For example, as shown in FIG. 2, a guide sub screen 220 having a rectangular shape is shown but the guide sub screen 220 may also be realized with a circle shape or other two- or three-dimensional geometric graphic figures.

In the operation 140, the generated guide sub screen is placed on a display main screen of the video recording device. Accordingly, during recording of a video, a user may monitor the guide sub screen and may check a current recording state of the video recording device. Accordingly, the guide sub screen helps a user's posture correction during recording of a video. After the recording is completed, the user may feel more stable and comfortable while playing and watching the recorded image.

In addition, if the movement speed value of the video recording device exceeds the normal reference value (i.e., if excessive movement occurs during recording of a video), a warning indication may be shown on the guide sub screen. For example, the exceeding value may be quantitatively displayed or the user may be notified via an output of the video recording device, such as at least one of a sound signal, a highlighting and a flashing screen. The guide sub screen may be displayed in real-time on a display main screen as an OSD together with a recorded external image.

FIG. 2 is a view illustrating an example of an OSD in a display window according to an exemplary embodiment. Referring to FIG. 2, a guide sub screen 220 is shown as an OSD on a display main screen 210 of the video recording device. The display main screen 210 is a screen shown through a display window such as an LCD monitor screen equipped in a digital camcorder, and also displays a movement of a subject. Here, the guide sub screen 220 as an OSD and the main screen 210 may be shown.

The guide sub screen 220 includes a first portion 221 representing an allowable guide of a movement speed and a second portion 222 indicating an operation state of a current video recording device. Accordingly, if the current operation state indicating portion 222 is displayed in the allowable guide portion 221, the video recording device operates in a stable state. Conversely, if the current operation state indicating portion 222 is out of the allowable guide portion 221, the video recording device operates in an instable state. That is, the guide sub screen 220 shows an abnormal operation state to a user. This will be described below with reference to FIGS. 3A to 3C and 4A to 4C.

Figure 3A:
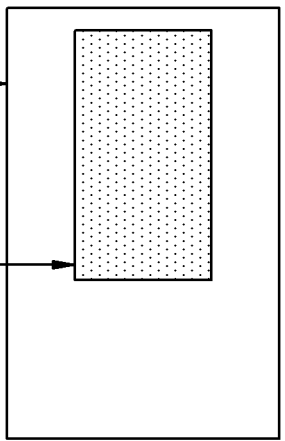
FIGS. 3A to 3C are views illustrating an example of a guide sub screen when a recording state represents a normal operation according to an exemplary embodiment.
Figure 3B:
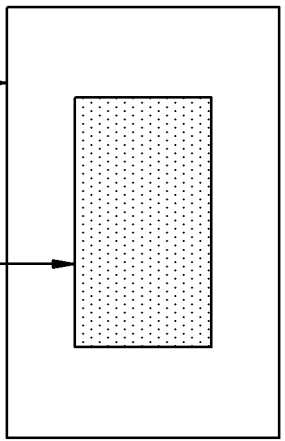
Figure 3C:
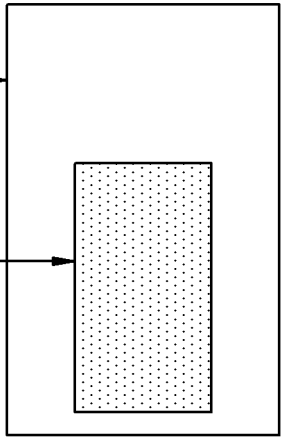

FIGS. 3A to 3C are views illustrating an example of a guide sub screen when a recording state represents a normal operation according to an exemplary embodiment. FIG. 3A represents a state where a video recording device moves to the left. Since the current operation state indication portion is still displayed within the guide indication portion, the guide sub screen represents a normal operation. On the contrary, FIG. 3C represents a state where the video recording device moves to the right, but still represents a normal operation. In addition, FIG. 3B represents that the current operation state indication portion is displayed at the middle of the guide indication portion and the movement of the video recording device stops. For example, this may be a case where a video is recorded using a fixing element such as a tripod.

Figure 4A:
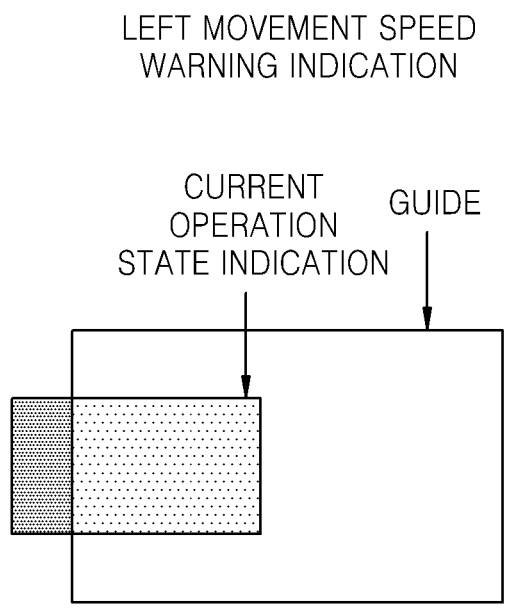
FIGS. 4A to 4C are views illustrating an example of a guide sub screen when a recording state represents an abnormal operation according to an exemplary embodiment.
Figure 4B:
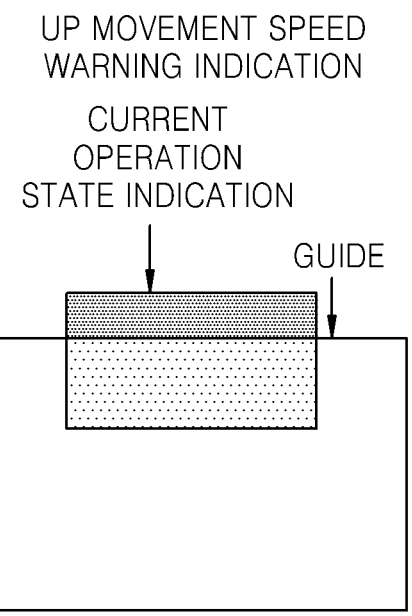
Figure 4C:
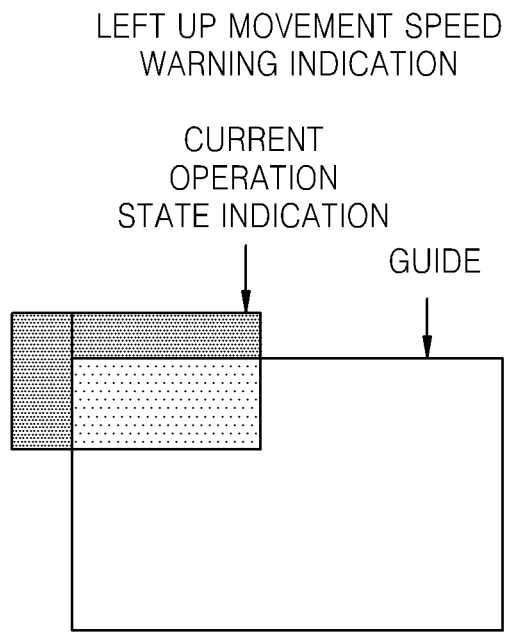

FIGS. 4A to 4C are views illustrating an example of a guide sub screen when a recording state represents an abnormal operation according to an exemplary embodiment. The abnormal state refers to a state in which a video is recorded with excessively fast panning or up/down/left/right shaking FIG. 4A represents a state where a video recording device moves to the left. Since the current operation state indication portion is displayed outside the guide indication portion and is excessively biased to the left, the guide sub screen represents an abnormal operation. At this point, a warning indication may be output. In addition, FIG. 4B represents that the video recording device moves up, but moves with an excessively fast speed. Thus, the state indication portion is outside of the guide indication portion. Lastly, when situations shown in FIGS. 4A 4B occur simultaneously, a guide sub screen of FIG. 4C may be shown. That is, this is a case where the video recording device moves up and to the left with an excessively fast speed such that the state indication portion is outside of the guide indication portion.

Figure 6:
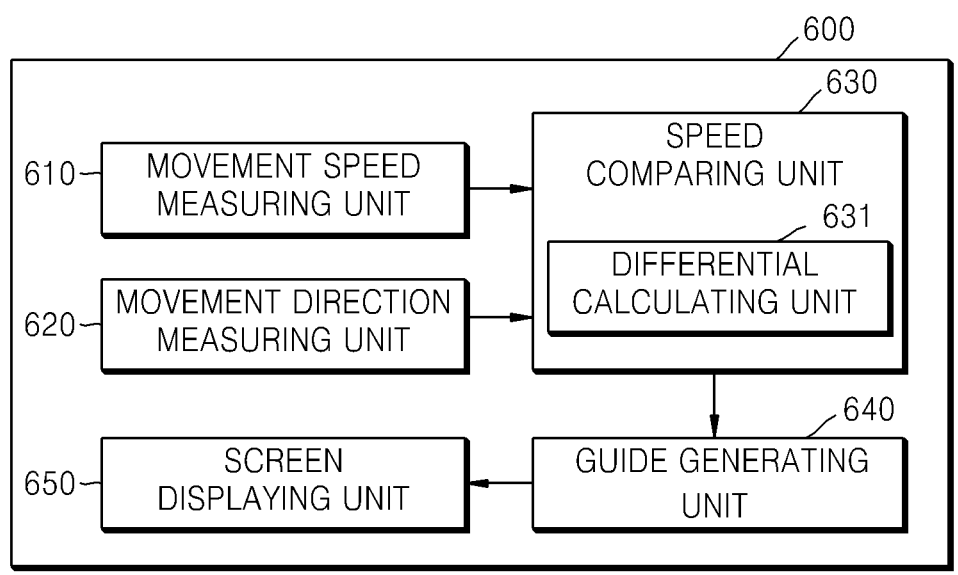
FIG. 6 is a functional block diagram illustrating a movement guide providing device according to another exemplary embodiment.

FIG. 6 is a functional block diagram illustrating a movement guide providing device 600 according to another exemplary embodiment. Referring to FIG. 6, the movement guide providing device 600 includes a movement speed measuring unit 610 which measures a movement speed according to a movement of a video recording device, a speed comparing unit 630 which compares the measured movement speed value of the video recording device with a normal reference value, a guide generating unit 640 which generates a guide sub screen that represents the compared result value, and a screen displaying unit 650 which displays the generated guide sub screen on a display main screen equipped in the video recording device.

The movement guide providing device 600 may further include a movement direction measuring unit 620 which measures a movement direction of the video recording device. The speed comparing unit 630 may further include a differential calculating unit 631 which calculates a differential value of the movement speed value and the normal reference value based on the movement direction.

Based on the movement guide providing method of the video recording device according to exemplary embodiments, a cameraman himself may monitor an image in real-time to confirm whether recording of an image is normally performed or not during recording of a video.

Exemplary embodiments provide a method and apparatus which overcome the above-mentioned limitations such as fast panning, fast zooming, and fast shaking during recording of a video.

That is, one of the most challenging factors when a recorded image is played after recording of a video is finished is that viewers may feel dizzy or uncomfortable because previously-recorded images move excessively fast. In addition, it is very difficult to re-record the previously-recorded images. However, exemplary embodiments overcome the above situations by addressing the various limitations during recording of a video.

While not restricted thereto, exemplary embodiments can be written as computer programs and can be implemented in general-use or special-purpose digital computers that execute the programs using a computer readable recording medium. Moreover, the computer readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs). Also, exemplary embodiments may be written as computer programs transmitted over a computer-readable transmission medium, such as a carrier wave, and received and implemented in general-use or special-purpose digital computers that execute the programs. Moreover, while not required in all aspects, one or more of the above-described units can include a processor or microprocessor executing a computer program stored in a computer-readable medium.

While exemplary embodiments have been particularly shown and described, it will be understood by those of ordinary skill in the art that various changes in form and details may be made therein without departing from the spirit and scope of the present invention as defined by the following claims.

What is claimed is:

1. A movement guide providing method of a video recording device, the method comprising:
measuring a movement speed and a movement direction according to a movement of the video recording device;
comparing the measured movement speed of the video recording device with a reference value corresponding to the movement direction;
generating a guide sub screen that represents a result of the comparing; and
displaying the generated guide sub screen on a display main screen of the video recording device,
wherein the reference value corresponds to a predetermined allowable movement speed corresponding to the movement direction and the guide sub screen indicates whether or not the movement speed of the video recording device exceeds the predetermined allowable movement speed corresponding to the movement direction.

2. The method of claim 1, wherein the guide sub screen represents the result of the comparing with at least one graphic shape.

3. The method of claim 1,
wherein the guide sub screen comprises a graphic figure that represents the measured movement direction along one axis and the result of the comparing.

4. The method of claim 3, further comprising calculating a differential value of the movement speed of the video recording device and the reference value corresponding to the movement direction.

5. The method of claim 1, wherein the displaying the generated guide sub screen comprises displaying a warning indication on the guide sub screen when the movement speed of the video recording device exceeds the reference value according to the result of the comparing.

6. The method of claim 5, wherein the displaying the generated guide sub screen further comprises not displaying the warning indication when the movement speed of the video recording device does not exceed the reference value according to the result of the comparing.

7. The method of claim 1, wherein the measuring the movement speed of the video recording device comprises measuring the movement speed of the video recording device by calculating a distance of the movement of the video recording device and a time that the video recording device takes for the movement, using a sensor comprised in the video recording device.

8. The method of claim 1, wherein the measuring the movement speed of the video recording device comprises measuring the movement speed using an Optical Image Stabilization (OIS) method or a Digital Image Stabilization (DIS) method.

9. The method of claim 1, wherein the movement of the video recording device comprises at least one of panning, zooming, and oscillating.

10. The method of claim 1, wherein the displaying the generated guide sub screen comprises simultaneously displaying, on the display main screen, the generated guide sub screen as an On Screen Display (OSD) in real-time and an external image recorded by the video recording device.

11. The method of claim 1, wherein:
the generated guide sub screen comprises a guide portion and a current state indication portion; and
the generating the guide sub screen comprises:
generating the guide sub screen such that at least part of the guide portion is located outside of the current state indication portion when the measured movement speed exceeds the reference value, and
generating the guide sub screen such that the guide portion is located entirely inside of the current state indication portion when the measured movement speed does not exceed the reference value.

12. The method of claim 11, wherein a location of the guide portion relative to the current state indication portion in the generated guide sub screen corresponds to a direction of the movement of the video recording device.

13. A non-transitory computer readable recording medium having recorded thereon a program for performing the movement guide providing method of claim 1.

14. A movement guide providing apparatus in a video recording device, the apparatus comprising:
a movement speed measuring unit which measures a movement speed and a movement direction according to a movement of the video recording device;
a speed comparing unit which compares the measured movement speed of the video recording device with a reference value corresponding to the movement direction;
a guide generating unit which generates a guide sub screen that represents a result of the comparing by the speed comparing unit; and
a screen display unit which displays the generated guide sub screen on a display main screen of the video recording device,
wherein the reference value corresponds to a predetermined allowable movement speed corresponding to the movement direction and the guide sub screen indicates whether or not the movement speed of the video recording device exceeds the predetermined allowable movement speed corresponding to the movement direction.

15. The apparatus of claim 14, wherein the guide sub screen represents the result of the comparing with at least one graphic shape.

16. The apparatus of claim 14,
wherein the guide sub screen comprises a graphic figure that represents the measured movement direction along one axis and the result of the comparing.

17. The apparatus of claim 16, wherein the speed comparing unit comprises a differential calculating unit which calculates a differential value of the movement speed of the video recording device and the reference value corresponding to the movement direction.

18. The apparatus of claim 14, wherein the screen displaying unit displays a warning indication on the guide sub screen when the movement speed of the video recording device exceeds the reference value according to the result of the comparing.

19. The apparatus of claim 14, wherein the movement speed measuring unit measures the movement speed of the video recording device by calculating a distance of the movement of the video recording device and a time that the video recording device takes for the movement using a sensor comprised in the video recording device.

20. The apparatus of claim 14, wherein the movement speed measuring unit which measures the movement speed of the video recording device using an Optical Image Stabilization (OIS) method or a Digital Image Stabilization (DIS) method.

21. The apparatus of claim 14, wherein the movement of the video recording device comprises at least one of panning, zooming, and oscillating.

22. The apparatus of claim 14, wherein the screen displaying unit simultaneously displays the guide sub screen as an On Screen Display (OSD) in real-time and an external image recorded by the video recording device.

* * * * *